(12) United States Patent
Shaqed et al.

(10) Patent No.: US 8,533,279 B2
(45) Date of Patent: Sep. 10, 2013

(54) METHOD AND SYSTEM FOR RECONSTRUCTING TRANSACTIONS IN A COMMUNICATION NETWORK

(75) Inventors: Ariel Shaqed, Ramat-Aviv (IL); David Lehavi, Haifa (IL)

(73) Assignee: Trading Systems Associates (TS-A) (Israel) Limited, London (GB)

( * ) Notice: Subject to any disclaimer, the term of this patent is extended or adjusted under 35 U.S.C. 154(b) by 0 days.

(21) Appl. No.: 13/496,345

(22) PCT Filed: Sep. 21, 2010

(86) PCT No.: PCT/IL2010/000788
§ 371 (c)(1),
(2), (4) Date: Mar. 15, 2012

(87) PCT Pub. No.: WO2011/036663
PCT Pub. Date: Mar. 31, 2011

(65) Prior Publication Data
US 2012/0179740 A1    Jul. 12, 2012

Related U.S. Application Data

(60) Provisional application No. 61/245,031, filed on Sep. 23, 2009.

(51) Int. Cl.
*G06F 15/16* (2006.01)
(52) U.S. Cl.
USPC .......................................... 709/206; 709/223
(58) Field of Classification Search
USPC ................. 709/203, 217, 219, 223, 224, 206
See application file for complete search history.

(56) References Cited

U.S. PATENT DOCUMENTS

| | | | | |
|---|---|---|---|---|
| 5,201,046 A | * | 4/1993 | Goldberg et al. | 1/1 |
| 6,437,799 B1 | * | 8/2002 | Shinomi | 345/666 |
| 6,611,845 B1 | * | 8/2003 | Dockter et al. | 707/776 |
| 6,738,813 B1 | | 5/2004 | Reichman | |
| 6,954,749 B2 | * | 10/2005 | Greenblatt et al. | 707/778 |
| 6,985,905 B2 | * | 1/2006 | Prompt et al. | 707/829 |
| 7,010,590 B1 | * | 3/2006 | Munshi | 709/224 |
| 7,076,728 B2 | * | 7/2006 | Davis et al. | 715/205 |
| 7,103,600 B2 | * | 9/2006 | Mullins | 1/1 |
| 7,353,223 B2 | * | 4/2008 | Klein | 707/610 |
| 7,424,530 B2 | | 9/2008 | Chagoly et al. | |
| 7,558,951 B2 | * | 7/2009 | Munshi | 713/150 |
| 8,291,066 B2 | * | 10/2012 | Melamed et al. | 709/224 |
| 2002/0198968 A1 | | 12/2002 | Shirriff | |
| 2003/0061209 A1 | * | 3/2003 | Raboczi et al. | 707/3 |

(Continued)

FOREIGN PATENT DOCUMENTS

| | | |
|---|---|---|
| EP | 1271847 A2 | 1/2003 |
| WO | 2008058263 A2 | 5/2008 |

*Primary Examiner* — Lashonda Jacobs
(74) *Attorney, Agent, or Firm* — Browdy and Neimark, PLLC

(57) ABSTRACT

In a distributed information network, a method and system for assembling messages in an input set of messages into one or more message assemblies. The method involves constructing an initial directed graph of the set of messages, wherein the directed graph consists of pairs of a first vertex and a second vertex, wherein, for each message in the set of messages, a first vertex is an the out node of the message and the second vertex is the in node of the message. A connectivity matrix is defined on the initial directed graph that is modified in an iterative process. A final directed graph is produced that is partitioned into disjoint subgraphs, each subgraph being an assembly of messages from the input message set.

22 Claims, 5 Drawing Sheets

(56) References Cited

U.S. PATENT DOCUMENTS

| | | | |
|---|---|---|---|
| 2003/0074352 A1* | 4/2003 | Raboczi et al. | 707/4 |
| 2006/0015512 A1 | 1/2006 | Alon et al. | |
| 2007/0147271 A1 | 6/2007 | Nandy et al. | |
| 2009/0030916 A1* | 1/2009 | Andersen et al. | 707/100 |
| 2009/0248376 A1 | 10/2009 | Silva et al. | |
| 2010/0121792 A1* | 5/2010 | Yang et al. | 706/12 |
| 2010/0228650 A1 | 9/2010 | Shacham et al. | |
| 2012/0310916 A1* | 12/2012 | Abadi et al. | 707/713 |

* cited by examiner (BEGINNING)

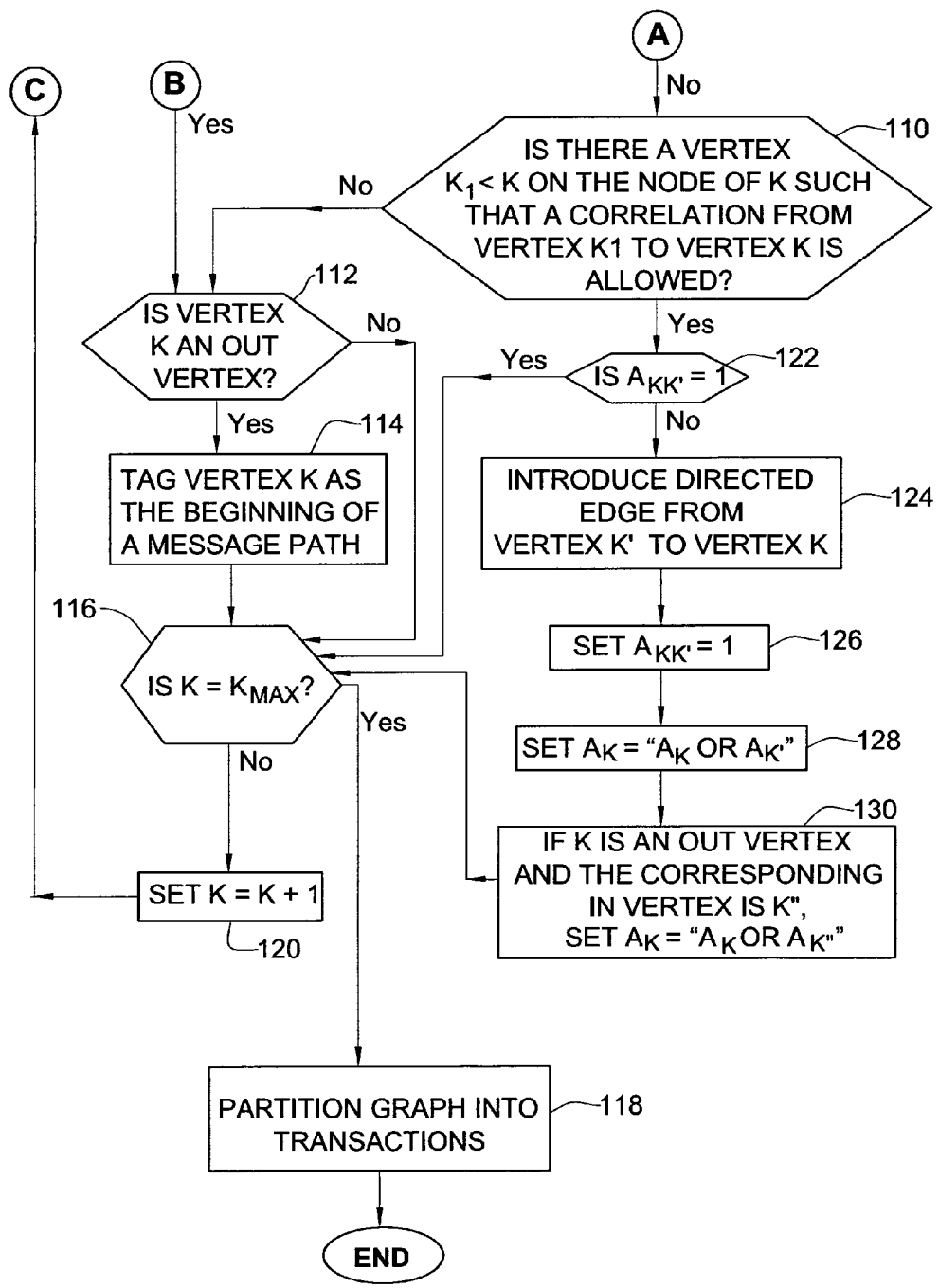
Fig. 4 (END)

METHOD AND SYSTEM FOR RECONSTRUCTING TRANSACTIONS IN A COMMUNICATION NETWORK

FIELD OF THE INVENTION

This invention relates to methods and systems for analyzing a communication network.

BACKGROUND OF THE INVENTION

The typical enterprise technology landscape today is characterized by the distributed nature of its information systems and the heterogeneity of its technologies. Following decades of evolution and innovation, it is common to see "best-of-breed" packaged applications, such as ERP, CRM, SCM, SRM, PLM, etc., home-grown systems, and legacy applications, each with numerous interfaces interconnecting them. In these distributed and complex environments, the act of processing a typical transaction spans numerous applications and technological boundaries, often rendering the enterprise incapable of understanding execution paths for the transactions as well as their logical and technical interdependencies. Without the requisite knowledge of how the transactions are executed, the enterprise is severely limited in its ability to monitor transactions and to detect and remedy bottlenecks, latencies, and points-of-failure.

Enterprise organizations therefore seek to increase the visibility of their automated business transactions as they see a direct correlation between transaction visibility and business performance. Achieving a high-degree of visibility enables the enterprise to improve customer service, to monitor transaction performance and health, to optimize the business logic, and to implement efficient solutions to problems as they arise.

U.S. Pat. No. 6,738,813 to Reichman discloses a system for monitoring Web sites, or other server systems, as seen from the computing devices of other users. In a preferred embodiment, the system includes an agent component that runs on the computing devices of service users to provide functionality for accessing and monitoring the performance of a server. The agents are remotely configurable over the Internet, and may be configured, for example, to execute a particular Web transaction while monitoring specified performance parameters (server response times, network hop delays, server availability, etc). Using a service provider Web site, a user of the service can set up a monitoring session in which agent devices of other community members are used to monitor the performance of the user's server system.

U.S. Pat. No. 7,424,530 to Chagoly discloses a method for graph manipulation of transactional performance data to identify and emphasize root causes of electronic business system transaction processing performance problems. A system transaction monitoring system, is utilized to obtain transaction performance data for a system. This transaction performance data is utilized to present a graph of a given transaction or transactions.

US Patent Publication 20100228650 discloses a method of tracking information in a multi-tier computerized environment involving detecting data associated with at least one request or transaction related to a byte stream; and matching a thread associated with the byte stream with the at least one request or transaction associated with the at least one packet according to predetermined fields within the byte stream.

US Patent Publication 20060015512 to Alon et al. discloses an apparatus for monitoring a selected tier in a multi-tier computing environment. Monitored request traffic includes at least one entering request received at a request entry port from an adjacent tier, identifying each request in the monitored request traffic and sending at least a request identifier to the context agent. The context agent also receives information relating to the request context of the entering request from the context agent associated with the adjacent tier and the context agent associates the information relating to the request context of the entering request with the entering request, in accordance with a request identifier.

SUMMARY OF THE INVENTION

Glossary

There follows a glossary of terms used in the following description and set of claims together with their definitions, some of them known in the art, others having been coined.

Computational Node

A computational node is a node of a communication network that receives and/or generates information. For the sake of convenience, a computational node is sometimes referred to herein simply a "node". Examples of nodes are a web server, database server, a queue, a virtual server in a virtual environment, and a process within a server. A cluster, a redundancy system, and multiple instances of the same server may be considered as being a single node.

A Message

A message is the unit of information sent on the application layer. Three types of information related to a message are defined: network information (TCP/IP), instance information and application (Application layer) information. Each message includes one or more message ID's and typically also includes any one or more of an ID of the origin node, the ID of the destination node, origin node time stamp, destination node time stamp, message type and match ID.

A Match ID

A value of a field or combination of fields within a message that identifies the logical flow of messages to which the message belongs. For example a flow of messages that constitutes an Order Single transaction instance may include a request message of the type "Single Order" and a response message these types belong to the same transaction is the fact that both messages hold the same value in the field "ClientOrderID". The value of the field "ClientOrderID" would be the match ID in this case The present invention provides a system and method for monitoring transactions within a distributed information network. The system of the invention comprises one or more collectors that record data relating to incoming and outgoing messages at the nodes of the communication network. The recorded data for each message typically includes an "in node ID" and an "out node ID", the message type, the time stamp of the message at the in node and the out node, and the match ID or match IDs of the message.

At various times the collector reconstructs recently completed transactions in the system from the recorded data. In accordance with this aspect of the invention, a directed graph is defined, wherein, for each message in an input set of messages, a first vertex and a second vertex are defined, where the first vertex is the out node of the message and the second vertex is the in node of the message. All of the vertices are ordered according to their time stamp. A directed edge is introduced into the directed graph from the out vertex to the in vertex of each message, and a directed connectivity matrix A is calculated in which $a_{kk'}=1$ if a directed path exists from the vertex k' to the vertex k. Otherwise $a_{kk'}=0$. The matrix A is then modified in an iterative process described in detail below. The result of the iterative process is a partition of the input set of messages into disjoint directed graphs, where each graph contains a vertex tagged as a beginning of a message path, and each of the graphs represents a transaction in the system.

The system of the invention also includes a management server. For one or more of the transactions identified by the collectors, the management server calculates one or more values of one or more parameters of the transaction. The parameters of the path type may be, for example, total transit time, or the processing time at each of one or more nodes. When the determined value of one or more of the parameters exceeds a predetermined threshold, an alert may be issued that may be displayed on the monitor. In addition, the processing time of messages at each of one or more nodes may be determined and a node history may be constructed. Statistics of each of the parameters of may be compiled, and when the value of any statistic exceeds a predetermined threshold, an alert can be issued.

The collectors may first use a binning method to partition an initial set of messages set of messages where all of the messages in a particular transaction are placed in the same bin. Each bin is then used as an input set of messages for the collectors.

Thus, in its first aspect, the invention provides a system for assembling in an input set of messages in a distributed information network into one or more message assemblies, each message having an out node in the network and an in node in the network, the system comprising:
(a) one or more message collection servers; each collection server being configured, to:
  a) construct a directed graph of the set of messages, wherein the directed graph consists of pairs of a first vertex and a second vertex, wherein, for each message in the set of messages, a first vertex is an the out node of the message and the second vertex is the in node of the message;
    order the vertices according to a time stamp of each vertex;
    construct a connectivity matrix A of the directed graph in which $a_{kk'}=1$ if a directed path exists from the vertex k' to the vertex k and $a_{kk'}=0$ otherwise.
    modify the matrix A in an iterative process in a process comprising:
      For k=1 to kmax, kmax being a number of vertices in the graph:
        if there is a vertex k'<k on the node of k such that a correlation from the vertex k' to the vertex k allowed, and if the current value of $a_{kk'} \neq 1$, introducing a directed edge into the directed graph from the vertex k' to the vertex k;
        setting $a_{kk'}=1$;
        if k is an out vertex and the corresponding in vertex is k", setting Ak"=Ak or Ak", where Ak is the kth row of the matrix A and Ak" is the k"th row of the matrix A; and
      partitioning the directed graph into disjoint subgraph, each subgraph being an assembly of messages from the input message set.
The system according to Claim 1 wherein the processor is further configured to partition the directed graph into disjoint subgraphs where each subgraph contains a vertex tagged as a beginning of a message path.

The processor may further be configured to execute a binning algorithm on an initial set of messages, the binning algorithm partitioning the initial set of messages into disjoint bins of messages, and one or more of the bins may be used as the input set of messages. In this case, each message in the initial set of messages is assigned one or more match IDs and the binning algorithm comprises:
  (i) determining an equivalence relation among the match IDs, a first match ID being equivalent to a second match ID if there exists a sequence of messages M1, . . . Ms in the initial set of messages such that Mk and Mk+1 have a common match ID, and
  (ii) partitioning the messages into disjoint bins of messages, any two messages being in the same bin if there exists a sequence of messages M1, . . . , Ms such that M1 is the first message, Ms is the second message, and Mk and Mk+1 have a common match ID.

The system may further comprise a management server configured to calculate one or more values of one or more parameters of the transactions. One or more of the parameters may be selected, for example, from a total transit time, and a processing time at each of one or more nodes. The management server may be configured to issue an alert when a determined value of one or more of the parameters exceeds a predetermined threshold. The management server may be further configured to determine a node history and to calculate statistics of one or more of the parameters of one or more nodes. The management server may be configured to issue an alert when the value of any statistic exceeds a predetermined threshold.

In another of its aspects, the invention provides a method for assembling messages in an input set of messages in a distributed information network into one or more message assemblies, each message having an out node in the network and an in node in the network, the method comprising:
  a) constructing a directed graph of the set of messages, wherein the directed graph consists of pairs of a first vertex and a second vertex, wherein, for each message in the set of messages, a first vertex is an the out node of the message and the second vertex is the in node of the message;
  ordering the vertices according to a time stamp of each vertex;
  constructing a connectivity matrix A of the directed graph in which $a_{kk'}=1$ if a directed path exists from the vertex k' to the vertex k and $a_{kk'}=0$ otherwise.
  modifying the matrix A in an iterative process in a process comprising:
    for k=1 to kmax, kmax being a number of vertices in the graph:
      if there is a vertex k'<k on the node of k such that a correlation from the vertex k' to the vertex k allowed, and if the current value of $a_{kk'} \neq 1$, introducing a directed edge into the directed graph from the vertex k' to the vertex k;
      setting $a_{kk'}=1$;
      if k is an out vertex and the corresponding in vertex is k", setting Ak"=Ak or Ak", where Ak is the kth row of the matrix A and Ak" is the k"th row of the matrix A; and
    partitioning the directed graph into disjoint subgraph, each subgraph being an assembly of messages from the input message set.
The method according to Claim 12 wherein further comprising partitioning the directed graph into disjoint subgraphs where each subgraph contains a vertex tagged as a beginning of a message path.

The method of the invention may further comprise executing a binning algorithm on an initial set of messages, the binning algorithm partitioning the initial set of messages into disjoint bins of messages, and one or more of the bins may be used as the input set of messages. In this case, each message in the initial set of messages is assigned one or more match IDs and the binning algorithm comprises:
  (i) determining an equivalence relation among the match IDs, a first match ID being equivalent to a second match ID if there exists a sequence of messages M1, . . . Ms in the initial set of messages such that Mk and Mk+1 have a common match ID, and (ii) partitioning the messages into disjoint bins of messages, any two messages being in the same bin if there exists a sequence of messages M1, . . . , Ms such that M1 is the first message, Ms is the second message, and Mk and Mk+1 have a common match ID.

The method of the invention may further comprise calculating one or more values of one or more parameters of the transactions. One or more of the parameters may be selected from a total transit time, and a processing time at each of one or more nodes. An alert may be issued when a determined value of one or more of the parameters exceeds a predetermined threshold.

The method may further comprise determining a node history calculating statistics of one or more of the parameters of one or more nodes. An alert may be issued when the value of any statistic exceeds a predetermined threshold.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 2:
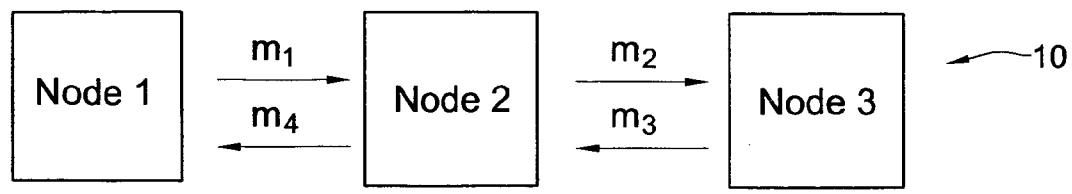
FIG. 2 shows a first representation of a flow of messages between nodes in a communication network.

FIG. 2 shows a schematic diagram 10 of message flow through a communication network. A message m1 originating at node 1 is assigned the match ID "1234" and is sent to node 2. Receipt of the message m1 at the node 2 generates a message m2 at the node 2 that is sent to node 3 after having been assigned two match IDs. One of the match IDs is the match ID of message 1 (1234). The other match ID is AXY. Receipt of the message m2 at the node 3 generates a message m3 at the node 3 that is sent to the node 2 with the match ID AXY. Receipt of the message m3 at the node 2 generates a message m4 that is sent to the node 1 with the ID AXY.

Figure 3:
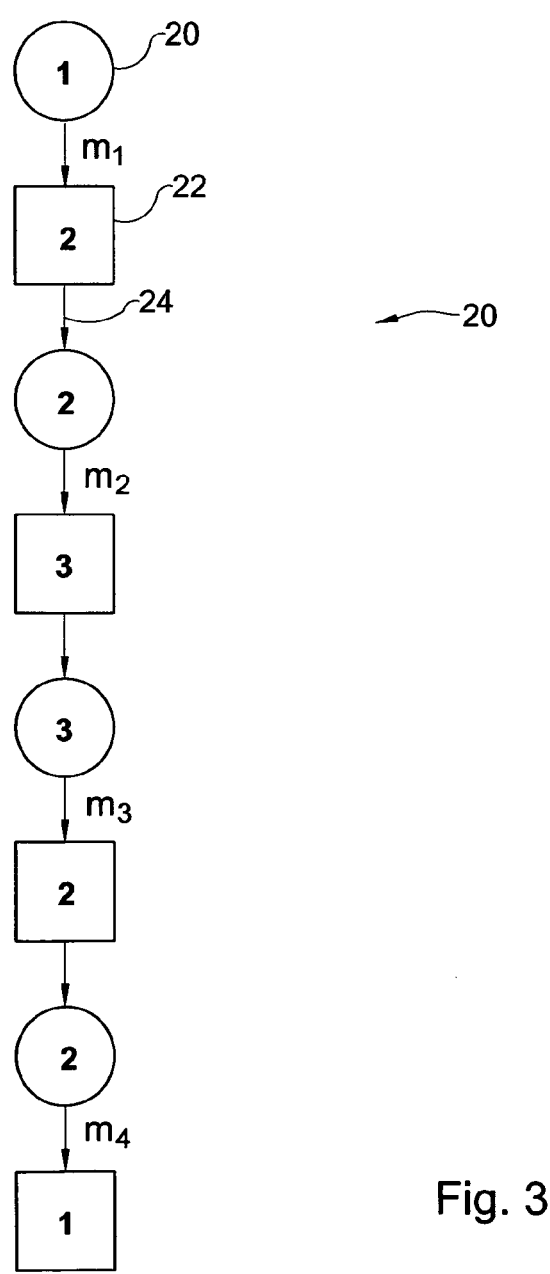
FIG. 3 shows a second representation of a flow of messages between nodes in a communication network.

FIG. 3 shows another schematic diagram 20 of the message flow 10 depicted in FIG. 2. In the diagram 20, a circle, such as the circle 20 indicates an origin node of a message, and a square, such as the square 22 indicates the destination node of the message. The number of the node is indicated inside the circle or square. Transmission of a message from one node to another is indicated by an arrow from the origin node to the destination node of the message. The message appears next to the arrow. An arrow from a destination node to an origin node, such as the arrow 24 indicates generation of a message within a node.

Figure 1:
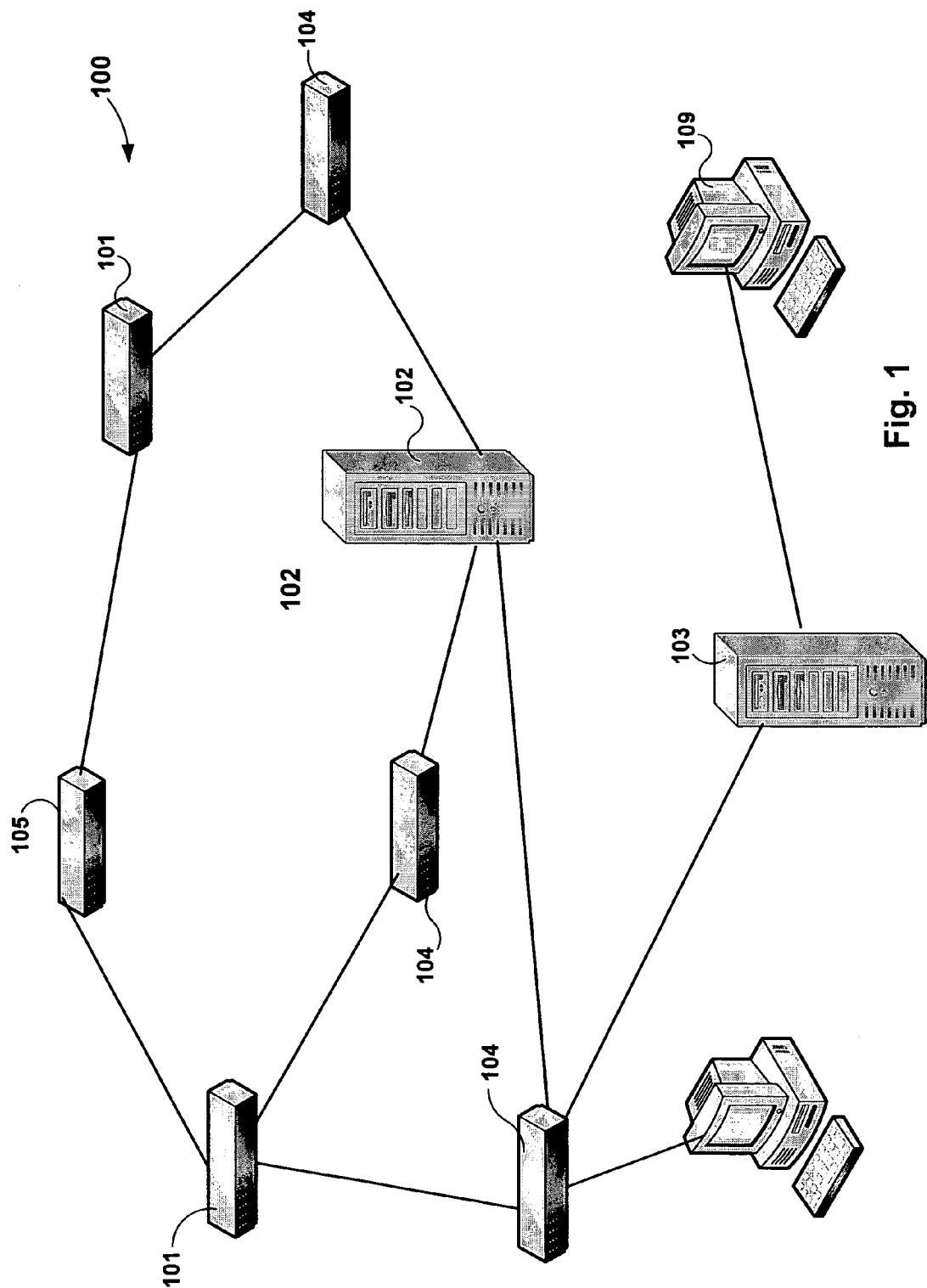
FIG. 1 shows a system for assembling messages in a communication network into message assemblies, in accordance with one aspect of the invention.

FIG. 1 shows a system, generally indicated by 100, for monitoring transactions within a distributed information network in accordance with one embodiment of this aspect of the invention. The network 100 comprises one or more nodes 106, one or more distribution switches 104, and one or more access switches 101. The nodes 106, distribution switches 104 and the access switches may be arranged in a hierarchy in which one or more clients 106 are connected to a common distribution switch 104 and one or more distribution switches are connected to common access switch 101. The access switches 101 are connected to a core 105 of the network 100. The network 100 further comprises one or more collectors 102 and a management server 103. In the embodiment of FIG. 1 the collector 102 is connected to one or more access switches 101 through a port monitor. A management server 103 is connected to the network 100 at a distribution switch 104.

The collector 102 records data relating to incoming and outgoing messages at the nodes 106. The recorded data for each message includes a in node ID and out node ID, the message type, the time stamp of the message at the in node and the out node, and the match ID or match IDs of the message. The collector 102 at various times reconstructs recently completed transactions in the system 100 from the recorded data, as described below.

The collector 102 may first use a binning method to partition the set of messages whose data were recorded into disjoint subsets, where all of the messages in a particular transaction are placed in the same subset. Initially, all of the messages having a given match ID are assigned to the same bin. Messages having more than one match ID will be assigned to more than one bin. After assignment of the messages to bins, two or more of bins having one or more common messages are combined into a single bin. The process of combining bins continues until the set of messages is partitioned into disjoint bins. The binning may be performed, for example, using a standard fast or efficient "Union Find" implementation, for example as disclosed in "Disjoint-set data structure" on Wikipedia as last modified on Aug. 28, 2010).

Figure 4:
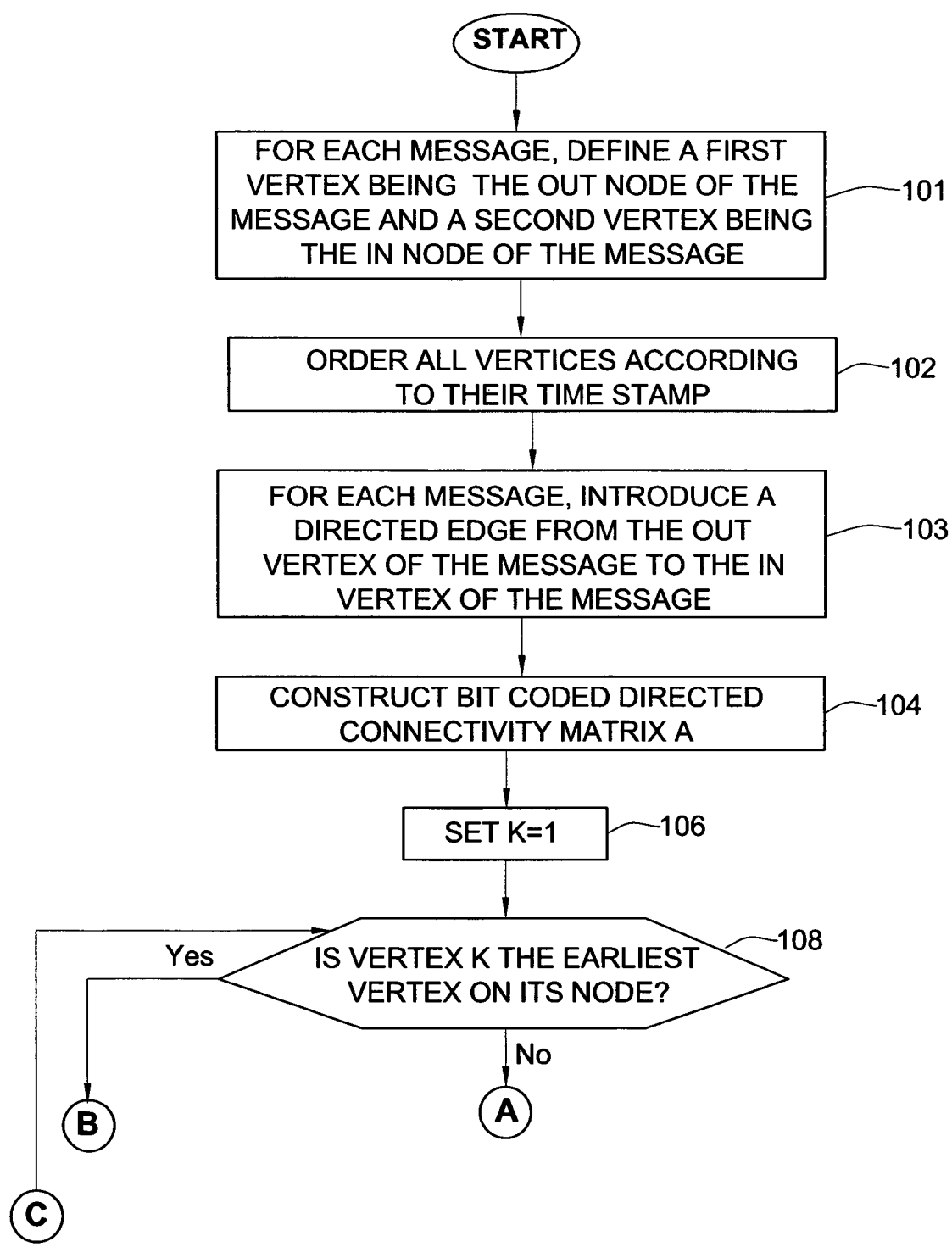
FIG. 4 shows a flow chart of a method for assembling messages into message assemblies in accordance with one aspect of the invention.

After binning, the collector 102 assembles the messages in each bin into transactions. FIG. 4 shows a method for assembling the messages in a given bin into one or more disjoint transactions in accordance with one embodiment of the invention. The method begins with step 101 where a directed graph is defined, wherein, for each message in the bin, a first vertex and a second vertex are defined, where the first vertex is the out node of the message and the second vertex is the in node of the message. Then, in step 102, all of the vertices are ordered according to their time stamp. In the case where there are two or more vertices having the same time stamp, the vertices having the same time stamp can be ordered arbitrarily subject to the restriction that a vertex corresponding to an out node of a message is positioned in the order before the vertex corresponding to the in node of the same message. Each vertex is thus assigned a vertex number k, where k is the position of the vertex in the ordering. Then in step 103, a directed edge is introduced into the directed graph from the out vertex to the in vertex of each message. In step 104 a directed connectivity matrix A is calculated in which $a_{kk'}=1$ if a directed path exists from the vertex k' to the vertex k. Otherwise $a_{kk'}=0$.

The matrix A is now modified in an iterative process as follows. In step 106, k is set to 1, and in step 108, it is determined whether the vertex k is the earliest vertex on its node. If no, then in step 110, it is determined whether there is a vertex k' that is earlier than the vertex k such that a correlation from the vertex k' to the vertex k is a predetermined allowed correlation. The allowed correlations reflect business considerations, so that transactions of interest are generated. If at step 110 it is determined that such an earlier vertex does not exist, or if in step 108 it is determined that k is the earliest vertex on its node, then the process proceeds to step 112 where it is determined whether the vertex k is an out vertex. If yes then in step 114 the vertex k is tagged as being a vertex at the beginning of a message path and the process continues to step 116. If at step 112 it is determined that k is not an out vertex, the process also continues to step 116. In step 116 it is determined whether the current value of k is the maximum value of k. If no, then in step 120 k is increased by 1 and the process returns to step 108.

If in step 110 it is determined whether there are vertices that are earlier than the vertex k such that a correlation from the vertex k' to the vertex k is allowed, then in step 122 it is determined whether the current value of $a_{kk'}=1$, where the vertex k' is the latest earlier vertex to the vertex k. If yes, then the process proceeds to step 116. If no, then in step 124 a directed edge is introduced into the directed graph from the vertex k' to the vertex k.

After step 124, the directed connectivity matrix A is updated. First, in step 126, $a_{kk'}$ is set to 1. Then in step 128, $A_K$ (row k of the matrix A) is set to the logical expression "$A_k$ or $A_{k'}$", wherein is a vector whose ith component is 0 if the ith component of Ak and Ak' are both 0, and the ith component of $A_k$ or $A_{k'}$ is 1 otherwise (i.e. if the ith component of either Ak or Ak' is 1). Finally, in step 130, if k is an out vertex, and the corresponding in vertex is k", then $A_{k''}$ is reset to the logical expression "$A_k$ or $A_{k''}$". The process then returns to step 116.

If in step 116 it is determined that the value of k is maximal, then in step 118 the directed graph is partitioned into disjoint subgraphs where each subgraph contains a vertex tagged in step 114 as a beginning of a message path. Each of the subgraphs represents a transaction in the system. The process then terminates in step 132.

If most of the correlations in step 110 are allowed and the bin has many nodes, then the complexity of the process of FIG. 4 is linear with the number of vertices in the bin. Since the step 124 is executed at most once for each vertex k, the memory required for vertex is bounded above by a constant so that the memory for all of the vertices may be allocated as an array.

Transactions identified by the process of FIG. 4 are input to the management server 103. For one or more of the transactions, the management server calculates one or more values of one or more parameters of the transaction. The parameters of the path type may be, for example, total transit time, or the processing time at each of one or more nodes. The values of the parameters may be displayed on the monitor 109. When the determined value of one or more of the parameters exceeds a predetermined threshold, an alert may be issued that may be displayed on the monitor. In addition, the processing time of messages at each of one or more nodes may be determined and a node history may be constructed. Statistics of each of the parameters of may be compiled, and when the value of any statistic exceeds a predetermined threshold, an alert can be issued.

Example

The invention will now be demonstrated by way of an example. Table 1 shows data collected by a collector, such as the collector 102, relating to 13 messages, collected by a collector, such as the collector 102. The messages were sent between 4 nodes.

As can be seem in Table 1, Match IDs are shared between node 1 and node 2, and between node 2 and node 3. However nodes 1 and 2 always send different match IDs and nodes 3 and 4 respond with both match IDs. This might occur, for example, if the match ID from node 1 is being sent to node 3 by some out-of-band method, or by some unmonitored path, or is reconstructed by a previous phase of the monitoring. Tier #1 Node 1 communicates with node 2 using a protocol with messages "Order" and "Cancel", receiving a message "Acknowledge" for each; Node 2 communicates with nodes 3 and 4 using some other protocol with messages "NEW" and "CXL", producing a message "ACK" or "ACK CXL" for each. These relations define the allowed correlations between message types.

TABLE 1

| ID | Message Type | From (out node) | Time Stamp | To (in node) | Time Stamp | Match ID 1 | Match ID 2 |
|---|---|---|---|---|---|---|---|
| 1 | Order | 1 | +1.1 ms | 2 | +2 ms | x86 | |
| 2 | Order | 1 | +1.2 ms | 2 | +1.9 ms | x87 | |
| 3 | NEW | 2 | +2.1 ms | 3 | +3.1 ms | | a9 |
| 4 | NEW | 2 | +2.2 ms | 4 | +3.2 ms | | a9 |
| 5 | Cancel | 1 | +2.2 ms | 2 | +3 ms | x86 | |
| 6 | CXL | 2 | +3.2 ms | 3 | +3.8 ms | | a11 |
| 7 | NEW | 2 | +3.3 ms | 4 | +4 ms | | a10 |
| 8 | ACK | 3 | +3.4 ms | 2 | +3.9 ms | x86 | a9 |
| 9 | ACK | 4 | +3.4 ms | 2 | +4.1 ms | | a9 |
| 10 | ACK CXL | 3 | +3.9 ms | 1 | +5 ms | x86 | a11 |
| 11 | Acknowledge | 2 | +4.2 ms | 1 | +5 ms | x86 | |
| 12 | ACK | 4 | +4.2 ms | 2 | +5 ms | x87 | a10 |
| 13 | Acknowledge | 3 | +5.1 ms | 1 | +6 ms | x87 | |

Binning

At each step, the message introduced into the system is shown together with the existing bins. Each bin is displayed as "{MatchID$_1$, MatchID$_2$, . . . |id$_1$, id$_2$, . . . }", which specifies that the bin holds all messages with the given match IDs, and gives the IDs of those messages.

Referring again to Table 1, the binning process proceeds as follows:

1. Message 1 is first processed. There is no bin for match ID "x86" (or, indeed, for any match ID), so a new bin is created. After this step, there is one bin, {x86: 1}.
2. Message 2 is processed. There is no bin for match ID "x87", so a new bin is created. After this step, there are two bins bins {x86: 1}, {x87: 2}.
3. Message 3 is processed, creating a new bin for match ID "a9". After this step, the bins are {x86: 1}, {x87: 2}, {a9: 3}.
4. Message 4 is processed, and is added to the existing bin for match ID "a9". After this step, bins {x86: 1}, {x87: 2}, {a9: 3,4}.
5. Message 5 is processed, and is added to the existing bin for match ID "x86". After this step, the bins are {x86: 1,5}, {x87: 2}, {a9: 3,4}.
6. Message 6 is processed, creating a new bin for match ID "a11". After this step, the bins are {x86: 1,5}, {x87: 2}, {a9: 3,4}, {a11: 6}.
7. Message 7 is processed, creating a new bin for match ID "a10". After this step, the bins are {x86: 1,5}, {x87: 2}, {a9: 3,4}, {a11: 6}, {a10: 7}.
8. Message 8 is processed. Since Message 8 has both Match ID x86 and Match ID a9, processing Message 8 unifies the bins for match IDs "x86" and "a9" and is added to the resulting bin. After this step, the bins are {x86,a9: 1, 3, 4, 5, 8}, {x87: 2}, {a11: 6}, {a10: 7}.
9. Message 9 is processed, and is added to the existing bin for match IDs "x86" and "a9". After this step, the bins are {x86,a9: 1, 3, 4, 5, 8, 9}, {x87: 2}, {a11: 6}, {a10: 7}.

10. Message 10 is processed. It causes the unification of the bins for match IDs "x86" and "a11", and is added to the resulting bin. After this step, the bins are {x86, a9, a11: 1, 3, 4, 5, 6, 8, 9, 10}, {x87: 2}, {a10: 7}.
11. Message 11 is processed, and is added to the existing bin for match IDs "x86" and "a9". After this step, the bins are {x86, a9, a11: 1, 3, 4, 5, 6, 8, 9, 10, 11}, {x87: 2}, {a10: 7}.
12. Message 12 is processed. It causes the unification of the bins for match IDs "x87" and "a10", and is added to the resulting bin. After this step, the bins are {x86, a9, a11: 1, 3, 4, 5, 6, 8, 9, 10, 11}, {x87, a10: 2, 7, 12}.
13. Message 13 is processed, and is added to the existing bin for match IDs "x87" and "a10". After this step, the bins are {x86, a9, a11: 1, 3, 4, 5, 6, 8, 9, 10, 11}, {x87,a10: 2, 7, 12, 13}.

Thus, 2 bins have been constructed containing of the messages of distinct transactions. Each bin contains the messages of one or more transactions, and the messages of each transaction is contained entirely inside a single bin.

After enough time has elapsed, we can safely retire bins to transaction assembly. This requires a criterion for determining when all transactions of a bin must have ended. For example, if no transaction may take more than 10 ms, at some time after +15 ms bin #1 is sent to transaction assembly, and at some time after +16 ms bin #2 is sent to transaction assembly. Any criterion can be used for retiring bins, including combinations of:

Time with no new messages added to the bin (this is the method detailed above)
Round-trip messages (e.g. a response received for every request)
Attempted transaction assembly of the bin (as below) yields transactions matching some business logic
Assembly The method of the invention for assembly of messages into transactions will be demonstrated on the bin {x86,a9,a11: 1, 3, 4, 5, 6, 8, 9, 10, 11} produced by the above binning process.

In this phase the match IDs are ignored, and the time stamps are used to order events, and message types are used to check for correlations allowed by business logic. In this example, the business logic configuration allows correlations only between "Order", "NEW", "ACK", and "Acknowledge" and between "Cancel", "CXL" and "CXL ACK".

Referring to step 101 in FIG. 4, an out vertex and an in vertex are created for each message in the bin (there will thus be 9 OUT vertices, denoted by ovals, and 9 IN vertices, denoted by rectangles). Each vertex is associated with a message, which in turn associates it with the appropriate time and node address of that message: for an OUT vertex that is the sending time, for an IN vertex that is the receiving time. Referring to step 102 in FIG. 4, these vertices are sorted in order of time. When two vertices have the same time, the method does not depend on the specific ordering chosen. Accordingly, the business logic can create a specific ordering to achieve a preferred display format, or an arbitrary ordering (e.g. that resulting from the sort function) can be used. After this step, there are 18 vertices, as shown in Table 2:

TABLE 2

| Vertex k | Vertex ID | Type | Time Stamp | IP |
|---|---|---|---|---|
| 1 | OUT 1 | Order | +1.1 | 1 |
| 2 | IN 1 | Order | +2 | 2 |
| 3 | OUT 3 | NEW | +2.1 | 2 |
| 4 | OUT 4 | NEW | +2.2 | 2 |

TABLE 2-continued

| Vertex k | Vertex ID | Type | Time Stamp | IP |
|---|---|---|---|---|
| 5 | OUT 5 | Cancel | +2.2 | 1 |
| 6 | IN 5 | Cancel | +3 | 2 |
| 7 | IN 3 | NEW | +3.1 | 3 |
| 8 | IN 4 | NEW | +3.2 | 4 |
| 9 | OUT 6 | CXL | +3.2 | 2 |
| 10 | OUT 8 | ACK | +3.4 | 3 |
| 11 | OUT 9 | ACK | +3.4 | 4 |
| 12 | IN 6 | CXL | +3.8 | 3 |
| 13 | OUT 10 | ACK CXL | +3.9 | 3 |
| 14 | IN 8 | ACK | +3.9 | 21 |
| 15 | IN 9 | ACK | +4.1 | 21 |
| 16 | OUT 11 | Acknowledge | +4.2 | 21 |
| 17 | IN 11 | Acknowledge | +5 | 11 |
| 18 | IN 10 | ACK CXL | +5 | 11 |

Referring now to step 103 in FIG. 4, a "network" edge is added directed from each OUT vertex to its corresponding IN vertex. For example, there is an edge from "OUT 6" to "IN 6". For every OUT vertex I, $A_i = 0 \ldots 0$ (no inbound edges), and for its matching IN vertex j $a\_j,i=1$ (i.e., an edge exists from i to j), so $A j = 0 \ldots 0 1 0 \ldots 0$ where the "1" appears in position i.

The starting matrix A is accordingly:
A__1=000000000000000000
A__2=100000000000000000
A__3=000000000000000000
A__4=000000000000000000
A__5=000000000000000000
A__6=000010000000000000
A__7=001000000000000000
A__8=000100000000000000
A__9=000000000000000000
A__10=000000000000000000
A__11=000000000000000000
A__12=000000001000000000
A__13=000000000000000000
A__14=000000000010000000
A__15=000000000100000000
A__16=000000000000000000
A__17=000000000000000100
A__18=000000000000010000

All values of k are now scanned, (steps 106 through 130 in FIG. 4).

1. Vertex OUT 1 is the first vertex on its node (node 1) (step 108). It is an OUT vertex [step 112], so it is tagged as the beginning of a new transaction.
2. Vertex IN 1 is the earliest vertex on its node (node 2) [step 108]. It is not an OUT vertex, nothing further is done.
3. Vertex OUT 3 is not the earliest on its node (node 2) [step 108]. Correlations from Order to NEW are allowed [step 110], so k'2. A directed "compute" edge is introduced from vertex 2 to vertex 3 [step 124], and a__32=1 [step 126]. Now
A__3=0 . . . 011 (because A__2=0 . . . 1) [step 127]. (i.e. "vertex 3 is reachable from vertices 2,1 on node 2". OUT 3 is an OUT vertex, with corresponding vertex IN 3 at position 7, so A__7=0 . . . 0111 [step 130].
4. Vertex OUT 4 is not the earliest on its node (node) [step 108]. Correlations from NEW to NEW are allowed [step 110], so k'=3, and A__4=1110 . . . 0. OUT 4 is an OUT vertex, with corresponding vertex IN 4 at position k"=8, so we set A__8=11110 . . . 0.
5. Vertex OUT 5 is not the earliest on its node (node 1) [step 108]. However a correlation from Order to Cancel is not allowed (by the business logic) [step 110], and it is an OUT vertex [step 112], so it is tagged as the beginning of a second transaction. Accordingly A__5=0.
6. Vertex IN 5 is not the earliest on its node (node 2) [step 108], but no correlations from NEW or from Order to Cancel are allowed (by the business logic) [step 110]. It is not an OUT vertex [112], so nothing further is done.
7. Vertex IN 3 is the earliest on its node 3 [108], but it is not an OUT vertex [step 112], so nothing further is done. Note that A__7=1110 . . . 0 from step 3 since vertex 7 is reachable from vertices 1,2, and 3.
8. Vertex IN 4 is the earliest vertex on its node (node 4) [108], but it is not an OUT vertex [112], so nothing further is done, keeping A__8=0 . . . 01111 from step 4.
9. Vertex OUT 6 is not the earliest vertex on its node (node 2) [108]. A correlation is allowed from vertex IN 5, so k'=6. A directed "compute" edge is introduced from vertex 6 to vertex 9 [112], and a__96=1 [126]. Now A__9=0000110 . . . 0. OUT 6 is an OUT vertex, with corresponding vertex IN 6 at position 12, so A__12=0000011001 . . . 0.
10. Vertex OUT 8 is not the earliest vertex on its node (node 3) [108]. We set k'=7 (correlation from NEW to ACK is allowed) [110], so a directed "compute" edge is introduced from vertex 7 to vertex 10 [124] and a__10,7=1 [126]; now A__10=11100010 . . . 0. OUT 8 is an OUT vertex, with corresponding vertex IN 8 at position 14, so we also have A__14=111000100010 . . . 0.
11. Vertex OUT 9 is not the earliest vertex on its node (node 4) [108]. We set k'=8 [110], so a directed "compute" edge is introduced from vertex 8 to vertex 11 [124] and a__11,8=1 [126]; now A__11=111100010 . . . 0. OUT 9 is an OUT vertex, with corresponding vertex IN 9 at position 15, so we also have A__15=111100010010 . . . 0.
12. Vertex IN 6 is not the earliest vertex on its node (node 3) [108]. No correlation is allowed to it from previous vertices on this node [110], and it is not an OUT node [112], so nothing further is done.
13. Vertex OUT 10 is not the earliest vertex on its node (node 3) [108]. We set k'=12 (correlation from CXL to ACK CXL is allowed) [110], so a directed "compute" edge is introduced from vertex 12 to vertex 13 [124] and a__13,12=1 [126]. Now A__13=0000110010010 . . . 0. OUT 10 is an OUT vertex, with corresponding vertex IN 10 at position 18, so we also have A__18=00001100100110 . . . 0.
14. Vertex IN 8 is not the earliest vertex on its node (node 2) [108]. We set k'=4 (values 9 and 6 are disallowed by the business logic configuration) [110], so a directed "compute" edge is introduced from vertex 4 to vertex 14 [124] and a__14,4=1 [126]. Now A__14=11110010010 . . . 0.
15. Vertex IN 9 is not the earliest vertex on its node (node 2) [108]. We set k'=14 [110], introducing an edge from vertex 14 to vertex 15 [124] and a__15,14=1 [126]. Now A__15=111100010010 . . . 0.
16. Vertex OUT 11 is not the first vertex on its node (node 2) [108]. We set k'=15 [110], introducing an edge from vertex 15 to vertex 16 [124] and a__16,15=1 [126]. Now A__16=1111000100100110 . . . 0. Because it is an OUT vertex with matching IN vertex 17, we also set A__17=111100010010011100.
17. Vertex IN 11 is not the first vertex on its node (node 1) [108]. We set k'=1 (the previous correlation to OUT 5 is disallowed because business logic configuration prevents correlating Cancel with Acknowledge) [110], but a__17,1=1 already in step 16, [122] and nothing further is done.
18. Vertex IN 10 is not the first vertex on its node (node 1) [108]. We set k'=5 [110], but as a__18,5=1 already in step 13) [122] nothing further is done.

Figure 5:
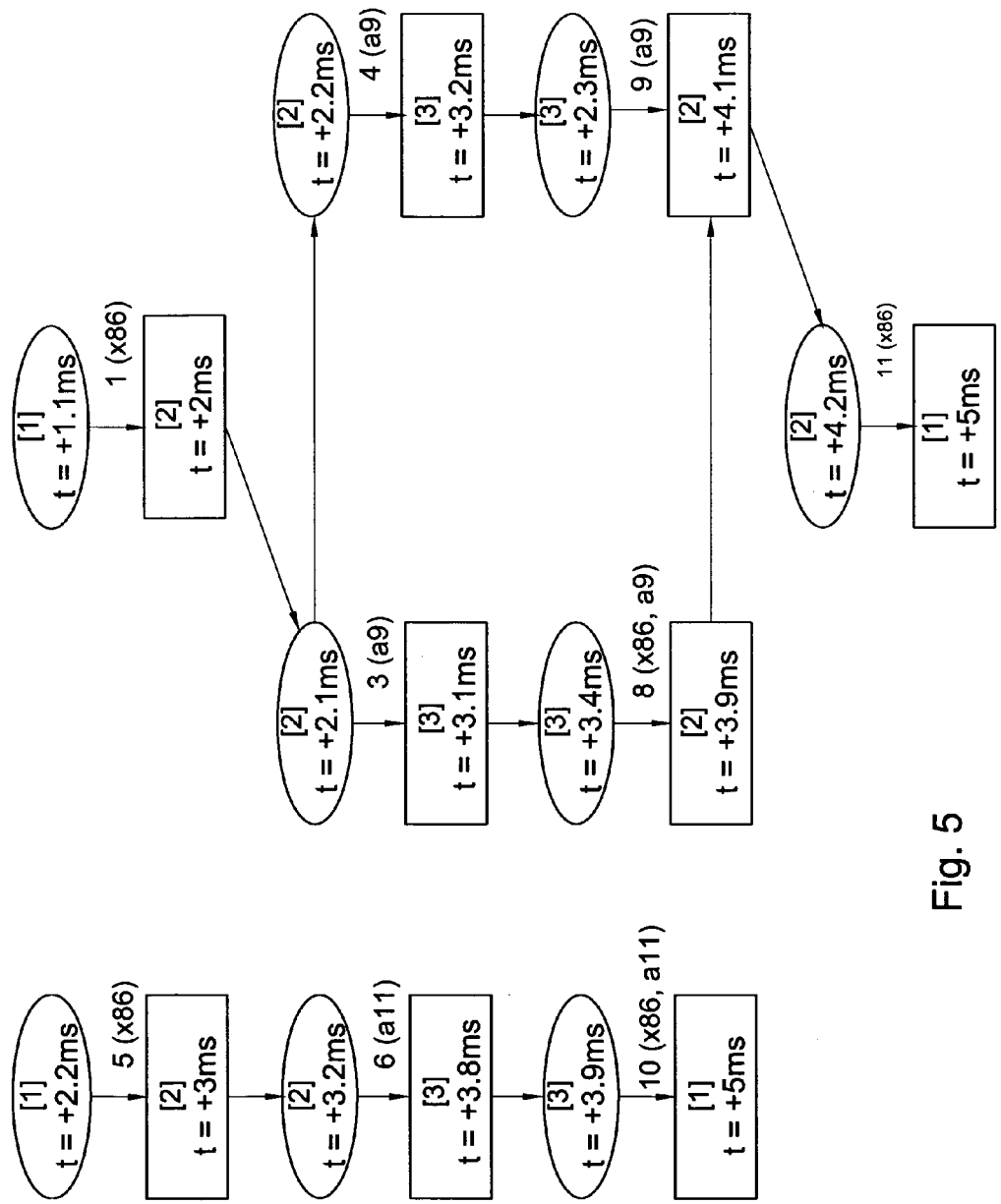
FIG. 5 shows two message assemblies constructed from an input set of messages by the method of the invention.

The results of the assembly are shown in FIG. 5. There are two connected components. One starts at vertex 1 (corresponding to the "Order" transaction flow), the other at vertex 5 (corresponding to the "Cancel" transaction flow).

The invention claimed is:

1. In a distributed information network, a system for assembling messages in an input set of messages into one or more message assemblies, each message having an out node in the network and an in node in the network, the system comprising:
  one or more message collection servers; each collection server being configured, to:
  a) construct a directed graph of the set of messages, wherein the directed graph consists of pairs of a first vertex and a second vertex, wherein, for each message in the set of messages, a first vertex is the out node of the message and the second vertex is the in node of the message;
  order the vertices according to a time stamp of each vertex;
  construct a connectivity matrix A of the directed graph in which $a_{kk'}=1$ if a directed path exists from the vertex k' to the vertex k and $a_{kk'}=0$, otherwise
  modify the matrix A in an iterative process in a process comprising:
  for k=1 to kmax, kmax being a number of vertices in the graph:
  if there is a vertex k'<k on the node of k such that a correlation from the vertex k' to the vertex k allowed, and if the current value of $a_{kk'} \neq 1$, introducing a directed edge into the directed graph from the vertex k' to the vertex k;
  setting $a_{kk'}=1$;
  if k is an out vertex and the corresponding in vertex is k", setting Ak"=Ak or Ak", where Ak is the kth row of the matrix A and Ak" is the kth row of the matrix A; and
  partitioning the directed graph into disjoint subgraph, each subgraph being an assembly of messages from the input message set.

2. The system according to claim 1 wherein the collection server is further configured to partition the directed graph into disjoint subgraphs where each subgraph contains a vertex tagged as a beginning of a message path.

3. The system according to claim 1 wherein the collection server is further configured to execute a binning algorithm on an initial set of messages, the binning algorithm partitioning the initial set of messages into disjoint bins of messages.

4. The system according to claim 3 wherein one or more of the disjoint bins is used as the input set of messages.

5. The system according to claim 3 wherein each message in the initial set of messages is assigned one or more match IDs and the binning algorithm comprises:
  (i) determining an equivalence relation among the match IDs, a first match ID being equivalent to a second match ID if there exists a sequence of messages M1, . . . Ms in the initial set of messages such that Mk and Mk+1 have a common match ID, and
  (ii) partitioning the messages into disjoint bins of messages, any two messages being in the same bin if there exists a sequence of messages M1, . . . , Ms such that M1 is the first message, Ms is the second message, and Mk and Mk+1 have a common match ID.

6. The system according to claim 1 further comprising a management server configured to calculate one or more values of one or more parameters of the transactions.

7. The system according to claim 6 wherein one or more of the parameters is selected from a total transit time, and a processing time at each of one or more nodes.

8. The system according to claim 6 wherein the management server is configured to issue an alert when a determined value of one or more of the parameters exceeds a predetermined threshold.

9. The system according to claim 6 wherein the management server is further configured to determine a node history.

10. The system according to claim 6 wherein the management server is further configured to calculate statistics of one or more of the parameters of one or more nodes.

11. The system according to claim 10 wherein the management server is configured to issue an alert when the value of any statistic exceeds a predetermined threshold, an alert can be issued.

12. In a distributed information network comprising a collector server, a management server, and one or more nodes, a method for assembling messages in an input set of messages into one or more message assemblies, each message having an out node in the network and an in node in the network, the method comprising, performing, by the collector server the following steps:
   a) constructing a directed graph of the set of messages, wherein the directed graph consists of pairs of a first vertex and a second vertex, wherein, for each message in the set of messages, a first vertex is the out node of the message and the second vertex is the in node of the message;
   ordering the vertices according to a time stamp of each vertex;
   constructing a connectivity matrix A of the directed graph in which $a_{kk'}=1$ if a directed path exists from the vertex k' to the vertex k and $a_{kk'}=0$ otherwise,
   modifying the matrix A in an iterative process in a process comprising:
   for k=1 to kmax, kmax being a number of vertices in the graph:
   if there is a vertex k'<k on the node of k such that a correlation from the vertex k' to the vertex k allowed, and if the current value of $a_{kk'} \neq 1$, introducing a directed edge into the directed graph from the vertex k' to the vertex k; setting $a_{kk'}=1$;
   if k is an out vertex and the corresponding in vertex is k", setting Ak"=Ak or Ak", where Ak is the kth row of the matrix A and Ak" is the kth row of the matrix A; and
   partitioning the directed graph into disjoint subgraph, each subgraph being an assembly of messages from the input message set.

13. The method according to claim 12 wherein further comprising partitioning, in the collector server, the directed graph into disjoint subgraphs where each subgraph contains a vertex tagged as a beginning of a message path.

14. The method according to claim 12 further comprising executing, in the collector server, a binning algorithm on an initial set of messages, the binning algorithm partitioning the initial set of messages into disjoint bins of messages.

15. The method according to claim 14 wherein one or more of the disjoint bins is used as the input set of messages.

16. The method according to claim 14 wherein each message in the initial set of messages is assigned one or more match IDs and the binning algorithm comprises:
   (iii) determining an equivalence relation among the match IDs, a first match ID being equivalent to a second match ID if there exists a sequence of messages M1, . . . Ms in the initial set of messages such that Mk and Mk+1 have a common match ID, and
   (iv) partitioning the messages into disjoint bins of messages, any two messages being in the same bin if there exists a sequence of messages M1, . . . , Ms such that M1 is the first message, Ms is the second message, and Mk and Mk+1 have a common match ID.

17. The method according to claim 12 further comprising calculating, in the management server, one or more values of one or more parameters of the transactions.

18. The method according to claim 17 wherein one or more of the parameters is selected from a total transit time, and a processing time at each of one or more nodes.

19. The method according to claim 17 further comprising issuing, via the management server, an alert when a determined value of one or more of the parameters exceeds a predetermined threshold.

20. The method according to claim 17 further comprising determining, by the management server, a node history.

21. The method according to claim 17 further comprising calculating, by the management server, statistics of one or more of the parameters of one or more nodes.

22. The method according to claim 21 further comprising issuing, via the management server, an alert when the value of any statistic exceeds a predetermined threshold.

* * * * *